United States Patent
Kraibühler et al.

(10) Patent No.: US 11,267,179 B2
(45) Date of Patent: Mar. 8, 2022

(54) METHOD FOR OPERATING A MACHINE FOR PROCESSING PLASTICS, UTILIZING EMBEDDED EXPERT KNOWLEDGE AND 3D GEOMETRY DATA

(71) Applicant: ARBURG GMBH + CO KG, Lossburg (DE)

(72) Inventors: Herbert Kraibühler, Lossburg (DE); Eberhard Duffner, Starzach (DE)

(73) Assignee: ARBURG GMBH + CO. KG, Lossburg (DE)

( * ) Notice: Subject to any disclaimer, the term of this patent is extended or adjusted under 35 U.S.C. 154(b) by 474 days.

(21) Appl. No.: 14/891,402

(22) PCT Filed: May 13, 2014

(86) PCT No.: PCT/EP2014/001283
§ 371 (c)(1),
(2) Date: Nov. 16, 2015

(87) PCT Pub. No.: WO2014/183863
PCT Pub. Date: Nov. 20, 2014

(65) Prior Publication Data
US 2016/0121532 A1     May 5, 2016

(30) Foreign Application Priority Data
May 15, 2013  (DE) ...................... 10 2013 008 245.5

(51) Int. Cl.
*G05B 13/02* (2006.01)
*B29C 45/76* (2006.01)
(Continued)

(52) U.S. Cl.
CPC ............ *B29C 45/766* (2013.01); *B29C 45/03* (2013.01); *B29C 45/7693* (2013.01);
(Continued)

(58) Field of Classification Search
CPC ... B29C 45/766; B29C 45/03; B29C 45/7693; B29C 2945/76946; G05B 13/028;
(Continued)

(56) References Cited

U.S. PATENT DOCUMENTS

| 5,900,259 A | 5/1999 | Miyoshi |
| 6,546,311 B2 | 4/2003 | Brown |

(Continued)

FOREIGN PATENT DOCUMENTS

| DE | 4025221 A1 | 2/1992 |
| DE | 102009000938 A1 | 8/2010 |

(Continued)

OTHER PUBLICATIONS

Beevers A., "Injection Control Gets Smart", European Plastics News, vol. 22, No. 9, Sep. 1, 1995, XP000541527.

(Continued)

*Primary Examiner* — M. N. Von Buhr
(74) *Attorney, Agent, or Firm* — Cantor Colburn LLP

(57) ABSTRACT

The invention relates to a method which is used to operate an injection molding machine for processing plastics, which has a mold closing unit (F) for opening and closing an injection mold (M) having at least one mold cavity (12) in order to produce an injection molded part (13), an injection molding unit (S) for plasticizing and injecting new plasticizable material into the mold cavity (12), and a control system (11) for operating the injection molding machine (10). Stored in the control system is expert knowledge (E) about the operation of the injection molding machine and the peripheral devices (P) of the latter which may possibly be present and about the production of injection molded parts (13) using injection molding technology, in order to produce an injection molded part (13) using interactive contact as needed by an operator by using injection molding param- (Continued)

eters. The fact that, in further steps, information about the component or the mold cavity (12) is provided to the control system (10) means that the plant and process parameters required for the production of the injection molded part (13) can be calculated by the control system (10) before the first injection molded part is produced, such that an alternative procedure for the operator-friendly setting of a machine for processing plastics is made available.

12 Claims, 3 Drawing Sheets

(51) Int. Cl.
  *B29C 45/03* (2006.01)
  *G06F 119/18* (2020.01)

(52) U.S. Cl.
  CPC .. *G05B 13/028* (2013.01); *B29C 2945/76946* (2013.01); *G05B 2219/14058* (2013.01); *G05B 2219/24086* (2013.01); *G05B 2219/32007* (2013.01); *G06F 2119/18* (2020.01)

(58) Field of Classification Search
  CPC ........... G05B 2219/14058; G05B 2219/24086; G05B 2219/32007; G06F 2119/18
  See application file for complete search history.

(56) References Cited

U.S. PATENT DOCUMENTS

| | | | | |
|---|---|---|---|---|
| 6,658,319 | B2 | 12/2003 | Shioiri | |
| 6,768,928 | B1* | 7/2004 | Nagasawa | G06F 30/00 700/98 |
| 8,219,230 | B2* | 7/2012 | Sinha | G06F 30/00 700/98 |
| 9,180,617 | B2* | 11/2015 | Tsai | B29C 45/7666 |
| 2002/0019674 | A1 | 2/2002 | Liang | |
| 2005/0114104 | A1* | 5/2005 | Friedl | B29C 33/3835 703/2 |
| 2006/0082009 | A1* | 4/2006 | Quail | B22D 17/007 264/40.1 |
| 2009/0053546 | A1* | 2/2009 | Di Domenico | B22D 17/007 428/544 |
| 2009/0204249 | A1* | 8/2009 | Koch | G05B 19/4097 700/108 |
| 2012/0059637 | A1 | 3/2012 | Yu | |
| 2012/0271443 | A1* | 10/2012 | Sinha | B29C 45/7693 700/98 |
| 2013/0103184 | A1* | 4/2013 | Morikawa | B22D 17/32 700/197 |

FOREIGN PATENT DOCUMENTS

| | | |
|---|---|---|
| DE | 102011016712 A1 | 11/2011 |
| EP | 0573912 B1 | 12/1993 |
| EP | 0699514 A2 | 3/1996 |
| EP | 2380709 A2 | 10/2011 |
| WO | 2010057231 A1 | 5/2010 |

OTHER PUBLICATIONS

International Search Report for corresponding application PCT/EP2014/001283 filed May 13, 2014; Filed Sep. 3, 2014.

Michaeli W. et al., "Selective Injection Moulding Machine Setting Using Simulation Results Part 1", Plastverabeiter, Huethig GMBH, vol. 45, No. 8, Aug. 1, 1994, pp. 30-32, 34. XP000486423.

Communication About the Intention to Grant a European Patent, dated Feb. 14, 2019 regarding EP 14728825.2, European Patent Office.

Granted Claims, EP 14728825.2, Feb. 14, 2019, European Patent Office.

\* cited by examiner

METHOD FOR OPERATING A MACHINE FOR PROCESSING PLASTICS, UTILIZING EMBEDDED EXPERT KNOWLEDGE AND 3D GEOMETRY DATA

FIELD OF THE INVENTION

The invention relates to a method for operating a machine for processing plastics and other plasticizable materials.

BACKGROUND

Such a method is known from EP 0 573 912 B1. In a data processing unit of the machine control there is located basic knowledge about an operation of an injection molding machine and the peripheral devices thereof. The machine offers the machine setter a sequence editor for generating a machine sequence. On the basis of the knowledge about sequences and the machine present in the data processing unit, the operator is only ever presented during input with a visual display on the screen of a selected subset of input options which may be compatibly incorporated with regard to the machine and injection mould into already existing parts of the already existing sequence. Input of operating sequences is simplified and facilitated as a consequence.

WO 2010/057231 A1 discloses a setting method for setting an operational basic setting for an injection molding machine for processing plastics. An interactive start-up assistant integrated in the controller guides an operator step-by-step through subsections of the setting process, during which values for process parameters of relevance to the system are defined, such that basic settings are quickly and reliably obtained. At the start of a testing phase, relevant parameters such as the flow characteristics of the molding mass, injection speed or melt temperature are provisionally established and used as the basis for defining a flow behavior parameter. Further basic settings are made on the basis of this parameter.

U.S. Pat. No. 6,546,311 B2 discloses a method in which components already produced by the machine are measured and have their physical properties tested, an association being established with a plurality of process parameters such as nozzle pressure and nozzle temperature. The pre-existing injection molding sequence is optimized on the basis of this information. Basic settings of the injection molding process must therefore be programmed before this optimization process can take place.

U.S. Pat. No. 5,900,259 A discloses a method in which injection molding conditions are optimized by plastics flow analysis on a virtual model of the injection molding. The injection molding is simulated, wherein prior knowledge may be available regarding the mould, cavity and gate or also material properties. The injection molding process is thus determined on the basis of flow analyses which are carried out on a simulated molding. The plastics flow analysis thus determines mould design, i.e. the geometric data of the molding are not the starting point.

U.S. Pat. No. 6,658,319 B2 discloses a further method in which injection molding conditions are optimized in a virtual optimization process. A molding is, however, firstly manufactured under provisional injection molding conditions in order to obtain actual profile data with regard to pressure and injection molding conditions. In other words, the machine is preset for injection molding and then the injection molding process is optimized in order to obtain suitable, good injection moldings. An operator is thus required initially to establish basic settings of the machine.

DE 10 2011 016 712 A1 discloses the use on an a injection molding machine of a touch-sensitive screen which permits input by contact with the operator interface.

The methods known in the prior art have in common that usually all, but at least some parameters or parameter variables such as speed, pressure, volume or temperature must be individually specified by programming the controller, such that an expert machine setter is in principle required.

BRIEF SUMMARY

The disclosure provides a controller-internal programmer for an operator-friendly procedure for setting a machine for processing plastics.

The starting point for setting, for example, an injection molding cycle of a plastics injection molding machine is here no longer parameters which are specified for the machine, but instead information about the injection molding as the part to be manufactured or about the mould cavity, on the basis of which the controller of the injection molding machine is capable, using the knowledge about the machine and the basic rules of injection molding integrated in its software, of defining the plant and process parameters which are in principle required for operation of the machine. The starting point is thus the molded part. As a consequence, the manufacturing process of an injection molding is predominantly determined, for example, by knowledge of the geometry of the part and not by the operator's expert knowledge in relation to the machine. Whereas in the past setting a machine involved a dialogue from the human towards the machine, a new approach is now involved with a dialogue from the machine to the human as molded part expert and process expert. The controller thus creates a basic setting of the plant and process parameters on the basis of the geometric data of the injection molding to be manufactured, as an experienced operator attempts to do, wherein the controller even furthermore already optimizes the overall process. This enables a non-expert to start up the machine without setting parameters in such a manner that an injection molding with the specified geometric data may be manufactured, i.e. without offline simulation calculations or test parts.

It is essential for the controller to receive geometric data about the component or injection molding 13 and thus a CAD data set which enables the controller, on the basis of the injection molding to be manufactured, to determine and set plant and process parameters for example, in the form of a machine setting data set. In conjunction with the material information, setting parameters are thus obtained which fundamentally enable application of the technology, in this case injection molding, for which purpose basic expert knowledge is required. Such settings may normally only be straightforwardly implemented by operators who have been trained on the specific machine.

These technological and process data are calculated before an injection molding is produced for the first time, no simulation being required and usually also not being carried out, i.e. no virtual injection molding is created. On the basis of the geometry, it is possible firstly to calculate the volume and, if the material is known, the weight of the injection molding. From these data, it is possible to determine an optimum injection point, from which flow paths and the wall thickness of the molding may be derived. Providing the mould has not yet been produced, the injection point may if required likewise be correspondingly influenced. Calculation of flow paths and wall thicknesses allows calculation of the necessary cooling times and pressures. The required temperature is determined by the material to be used and the limit values specified thereby for the processing thereof. An original setting based on the geometry of the part art to be manufactured on the machine must thus be determined, something which can normally only be carried out by an experienced operator. As a result, on the basis of the specified geometric and material data, the operator receives setting technology data for the first production of the molding. The component information is sent to a molding assistant within the controller, and the assistant uses said information as the basis for calculating the plant and process parameters to be set.

The molding assistant preferably tests the parameters calculated in this way for plausibility as to whether a component or injection molding can be manufactured therefrom, and finally adopts it as a setting. Plausibility testing also includes the limits applicable to the machine, such as for example exceeding possible injection speeds or possible travel paths, for example of parts of the moulid closing unit or the injection moulid. If the molding assistant still lacks information for manufacture, it attempts interactive contact with the operator in order to obtain further information. If it receives no further information, it informs the operator that the component might not be manufacturable in this manner as an injection molding in the light of the given plant or machine characteristics and the provided component data (for example the molding assistant might also suggest that the operator fit the plant with a feed screw having a different screw diameter). Further information preferably includes the material, which has an influence on flow behavior and thus on the process parameters. Such information or data from design, however, above all also include the geometry of the molding or of the moulid cavity and the arrangement of the gate geometry, in order to enable the molding assistant to determine, for example, flow paths and flow rates. With specified geometric data, the molding assistant is, however, also capable of calculating the optimum injection point under the given constraints.

In addition, in a preferred embodiment, an injection moulid assistant may be provided which additionally defines operating parameters for the operation of a specific injection moulid, which parameters are required, together with the plant and process parameters, for manufacturing the specified molding on the particular injection moulid on this injection molding machine. In this case too, plausibility testing, optionally with further interactive contact with the operator, is carried out.

In addition, a quality assistant may be provided which in particular processes the required characteristics of the injection molding to be manufactured and the associated tolerance ranges as information, requests supplemental information and so influences plant and process parameters and/or operating parameters to optimize the stability of the process sequence.

All the assistants, i.e. molding assistant, injection moulid assistant and quality assistant, may be associated alone or together with just one portion of the process sequence, one plant part of the injection molding machine or also one characteristic or geometric feature of the injection molding, in order to generate the best possible manufacturing process sequence on the associated production plant while requiring the operator to have little detailed knowledge of the plant.

Further advantages are revealed by the subclaims and the following description of a preferred exemplary embodiment.

BRIEF DESCRIPTION OF THE DRAWINGS

The invention is explained in greater detail below with reference to an exemplary embodiment illustrated in the Figures, in which.

DETAILED DESCRIPTION OF PREFERRED EMBODIMENTS

The invention will now be explained in greater detail by way of example with reference to the appended drawings. However, the exemplary embodiments are merely examples, and are not intended to restrict the inventive concept to a specific arrangement. Before the invention is described in detail, it should be noted that it is not limited to the particular components of the device and the particular method steps, since these components and methods may vary. The terms used herein are merely intended to describe particular embodiments and are not used in a limiting manner. In addition, where the description or the claims use the singular or indefinite article, this also covers a plurality of said elements, providing that the overall context does not unambiguously indicate otherwise.

The terms machine and plant are hereinafter used synonymously for one another, unless the specific description makes it clear that such is not the case. Furthermore, a distinction is drawn between the desired component as a starting point and the injection molding, produced on the machine/plant, which is to be manufactured using the method.

Figure 1:
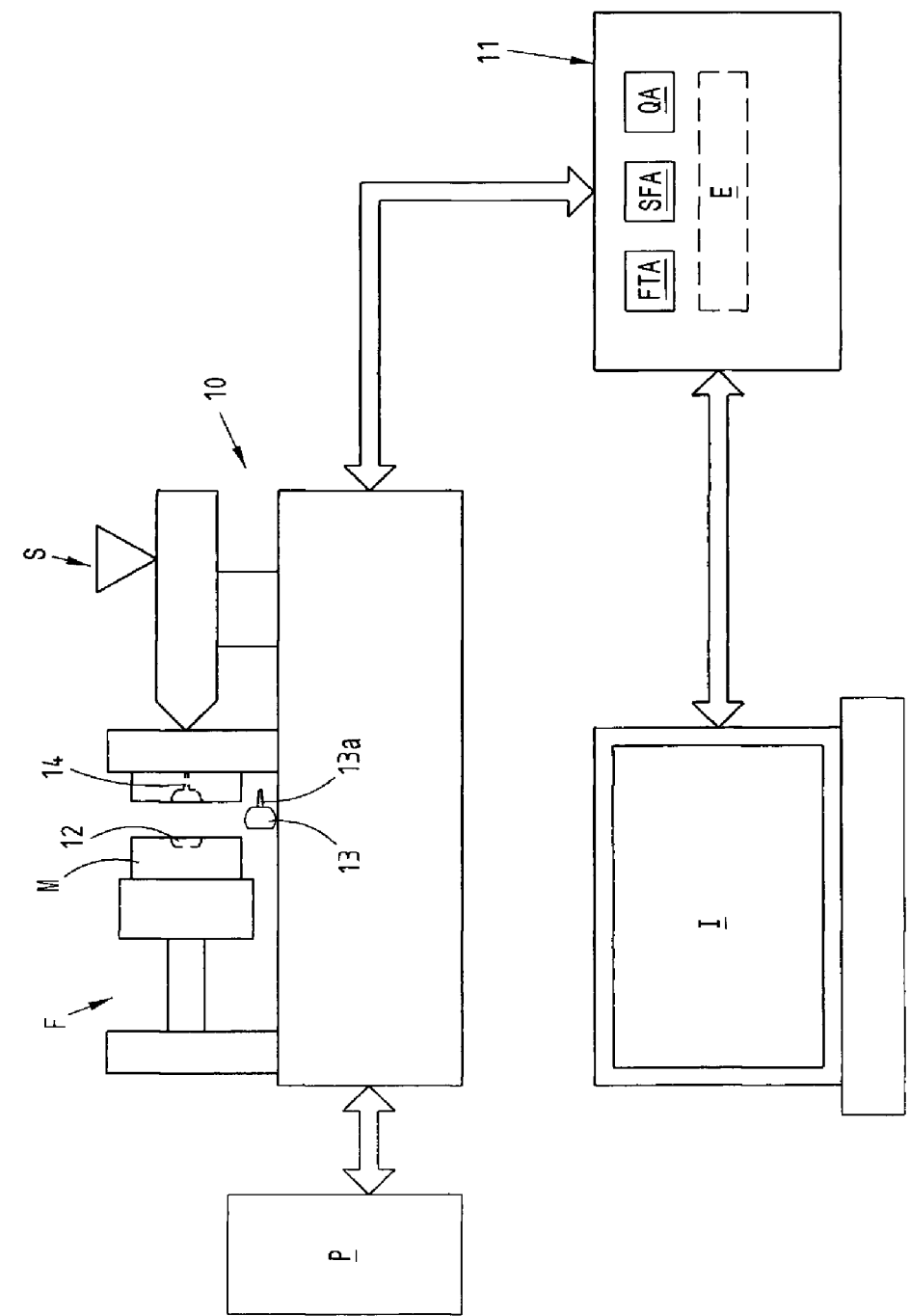
FIG. 1 is a schematic diagram of injection molding machine and associated controller with operator control unit.

FIG. 1 is a schematic diagram of a machine for processing plastics and other plasticizable materials such as pulverulent and/or ceramic compositions. The injection molding machine 10 comprises a moulid closing unit F for opening and closing an injection moulid M having at least one moulid cavity 12 for manufacturing an injection molding 13 corresponding to the shape of the moulid cavity. In FIG. 1, the injection moulid M is open and the injection molding 13 optionally with its stalk 13a has been ejected from the moulid cavity 12. The gate geometry 14, via which plasticizable material is supplied to the moulid cavity 12 from an injection molding unit S, of the moulid cavity 12 is also visible.

Associated with the injection molding machine 10 is a controller 11 which contains expert knowledge E about operation of the injection molding machine and any possible present peripheral devices P and basic rules about the manufacture of injection moldings 13 using injection molding technology. Using this expert knowledge, it is possible to manufacture an injection molding 13 with reference to injection molding parameters, if necessary after interactive contact with an operator. A human-machine interface I is provided for interactive contact with the operator, which is made available for example by a screen with keyboard, a (multi-)touch screen or also other suitable means, such as for example speech input.

Figure 2:
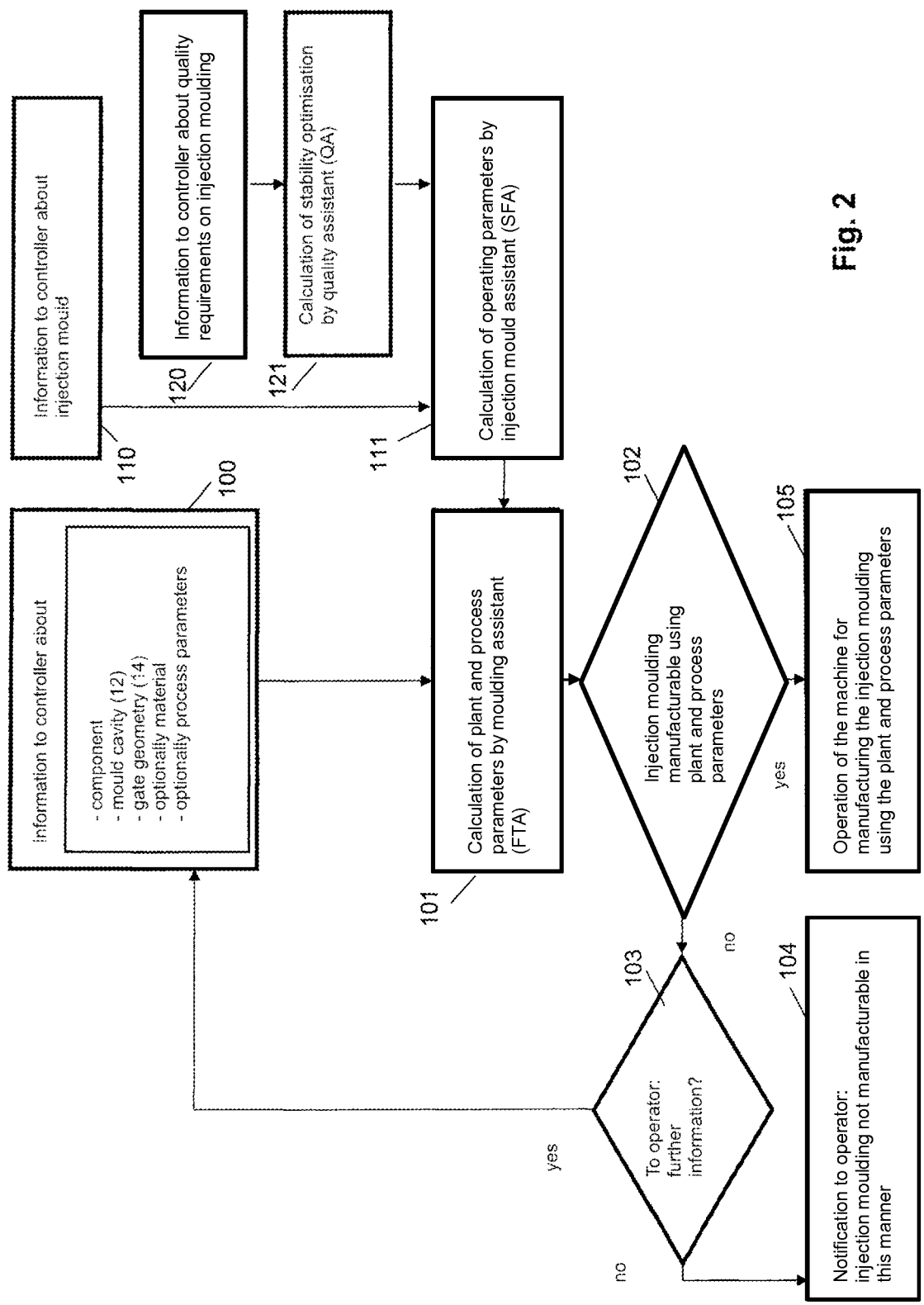
FIG. 2 is a flow diagram for setting and parameterizing the plant using various assistants.

FIG. 2 shows the method sequence. At the start of the method, in step 100 the controller receives information about the molding to be manufactured or the moulid cavity 12 in which the injection molding 13 is to be manufactured. This information may be 3D data in a data format which is known to the controller 10 and may be processed thereby. On the basis of the information defined in step 100 and using the expert knowledge/model calculator E, in step 101 the injection molding machine calculates plant and process parameters required for manufacturing the injection molding, wherein subsequent to this calculation the injection molding machine is preferably also operated according to step 105 using the injection molding parameters defined in this manner. It is thus not necessary to program individual parameters or parameter variables such as speeds, pressures, quantities, temperatures etc. individually for the manufacturing process, the controller instead defining, on the basis of the part to be manufactured, what steps are required for manufacturing said part using which particular plant and process parameters.

A molding assistant FTA within the controller 11 is preferably used for this purpose. Said assistant is provided with the information about the injection molding 13 in step 100, such that, in step 101, it can calculate the injection molding parameters as plant and process parameters. The molding assistant then tests the injection molding parameters defined in this manner for plausibility, i.e. as to whether, using these injection molding parameters, an injection molding 13 can be manufactured with the specified component information on the injection molding machine 10. The result of this request shown in step 102 is either that the part can be manufactured, whereupon the machine operates according to step 105 to manufacture the injection molding. If the injection molding cannot be manufactured using this information, an interaction with the operator takes place, i.e. the operator is requested by the human-machine interface I to provide further information which enables manufacture of the injection molding 13 optionally with modification of the plant and process parameters or also components of the plant. If the operator is able to provide further information in response to the request in step 103, steps 100 to 102 are repeated. If the operator is unable to provide further information, the operator is notified in step 104 that the component is not manufacturable or is manufacturable only to a limited extent as an injection molding using the data, models and plant components available in this optimization step. Under certain circumstances, suggestions may be made to the operator as to changes which need be made to the plant for it nevertheless to be possible to manufacture the injection molding.

Such further information may be, for example, information about the material to be processed, wherein the material is either specified to the controller or the material to be processed is selected by the operator from an existing selection of materials known to the controller 11. This information is likewise used in step 101 for calculating the plant and process parameters.

Preferably, however, the molding assistant is notified of the information about the geometry of the injection molding 13 to be manufactured or of the mould cavity 12. This information preferably also includes the gate geometry 14, since, if the controller 11 is aware of the gate geometry 14, it is also able to use its expert knowledge and model calculators E to calculate the flow paths, wall thickness and flow rate from the geometry of the injection molding 13 and likewise the necessary pressures on the basis of flow path length and injection volumes. Cooling times may likewise be calculated from the wall thicknesses. Volume and optionally material information additionally make it possible to calculate the volume of material to be injected or the dispensing volume of the screw, etc.

It is in principle possible to specify further process parameters which are of relevance to the injection molding process to the controller 11 by data transfer or also by the operator, such as for example pressure, temperature, quantity of material, speed, position, time, core pulling activity, demolding or ejection of the injection molding, opening paths or speeds of the moulid closing unit F or other individual components of the injection molding machine or of peripheral devices P. This information may already be known to the controller 11 or be requested by interactive contact with the operator in step 103. Such information does not arise solely from the component geometry, but is capable of influencing the manufacturing process in such a way that it should be present to ensure a stable process sequence.

As the sequence proceeds, during manufacture of injection moldings 13 the machine may in turn receive further information about the injection molding and use this information for further optimization of the prevailing original setting. An iterative process thus proceeds on the basis of the information available to the molding assistant FTA of the controller 11 by the steps:

calculating by the molding assistant of the injection molding parameters as plant and process parameters without simulation of the component, testing of the plausibility of the calculated parameters by means of the molding assistant FTA, as to whether, using the specified information, the component can be manufactured as an injection molding 13 on the machine 10, if plausibility testing reveals that the injection molding 13 cannot be manufactured in this manner, the operator is interactively contacted in order to obtain further information.

Once the original setting has been set and the first injection moldings have been produced, this information may also be further information from the machine which then enables optimization when the preceding steps are repeated. Should further changes to the information no longer be possible, the operator is informed that the injection molding is not manufacturable using the associated injection molding machine. If it is manufacturable on the machine, the machine is operated accordingly. Offline simulation of the injection molding is not necessary.

In addition, further assistants may also be provided. The controller may for example comprise an injection moulid assistant SFA which processes information about the injection moulid M. Geometry, structure and properties of the injection moulid M may be sent to the injection moulid assistant SFA for this purpose. This information may be, for example, about the geometric structure of the injection moulid, about the number of cavities, the arrangement and embodiment of the cooling ducts or also information relating to the opening path or the presence of any mechanical axes in the tool, such as core pullers. On the basis of the information about the injection moulid M provided in step 110, operating parameters are then calculated by the injection moulid assistant SFA in step 111. These operating parameters are in turn provided to the molding assistant FTA which, using this additional information, calculates plant and process parameters in step 101. As shown in steps 101, 102 and 103 in FIG. 2, plausibility testing may also proceed here, optionally with interactive contact with the operator, wherein preferably (as is not shown in FIG. 2) further information may also be information relating to the injection moulid M and, on the basis of this further information, both the plant and process parameters and the operating parameters may be influenced. Depending on the result of steps

102 and 103, the machine is operated accordingly for manufacturing the injection molding 13 or the operator is informed that the injection molding 13 is not manufacturable in this manner on this machine.

A quality assistant QA may furthermore be associated with the controller, wherein the required quality features of the injection molding 13 to be manufactured with the associated information tolerance ranges are then made available to the controller 11. In this case too, further information may be requested by interactive contact with the operator. On the basis of these specifications, the quality assistant QA influences the plant and process parameters and/or the operating parameters to optimize the stability of the process sequences, this being shown in steps 120 and 121.

All the assistants, i.e. the molding assistant FTA, the injection moulid assistant SFA and the quality assistant QA in principle have an influence on the injection molding process, wherein they may influence the entire injection molding process or parts thereof. They may likewise only influence only some of the components of the injection molding machine 10 and the peripheral devices P. In addition, the injection molding 13 may be virtually broken down into parts, wherein the individual assistants may have a different influence on the portions of the component. The goal is to obtain a process sequence and plant parameterization which is predominantly determined by a knowledge of the geometry of the part to be manufactured in conjunction with the expert knowledge and model calculators E present in the controller and not by the operator's expert knowledge. As a consequence, setting the machine involves a sequence which differs from the previous procedure because the starting point is the injection molding 13 with its required properties, which the machine gets to know and decides on the basis thereof with its assistants in the controller 11 how the part should be manufactured as an injection molding.

Within the controller 11, the injection moulid assistant SFA for example ensures that the basic sequence of the injection molding process is calculated and parameterized on the basis of the moulid geometry. It is additionally conceivable to make use of flow simulations which, on the basis of the geometry of the injection molding 13 together with material characteristics, calculate nominal process profiles with regard to speed, pressure and temperature and tailor them to the injection molding machine 10. The quality assistant QA makes use of quality models which, on the basis of the geometry of the injection molding 13 or other quality features, such as for example strength or voids and the associated tolerance specifications, optimize the stability of the process settings.

Thanks to the presence of component, moulid and quality data, for example from moulid design or the technical specification of the component as the starting point for the various assistants, the operator's decisions are ideally reduced to simple yes/no inputs into the human-machine interface I, while the expert knowledge is stored by the controller 11 and presented in preselected manner.

Figure 3:
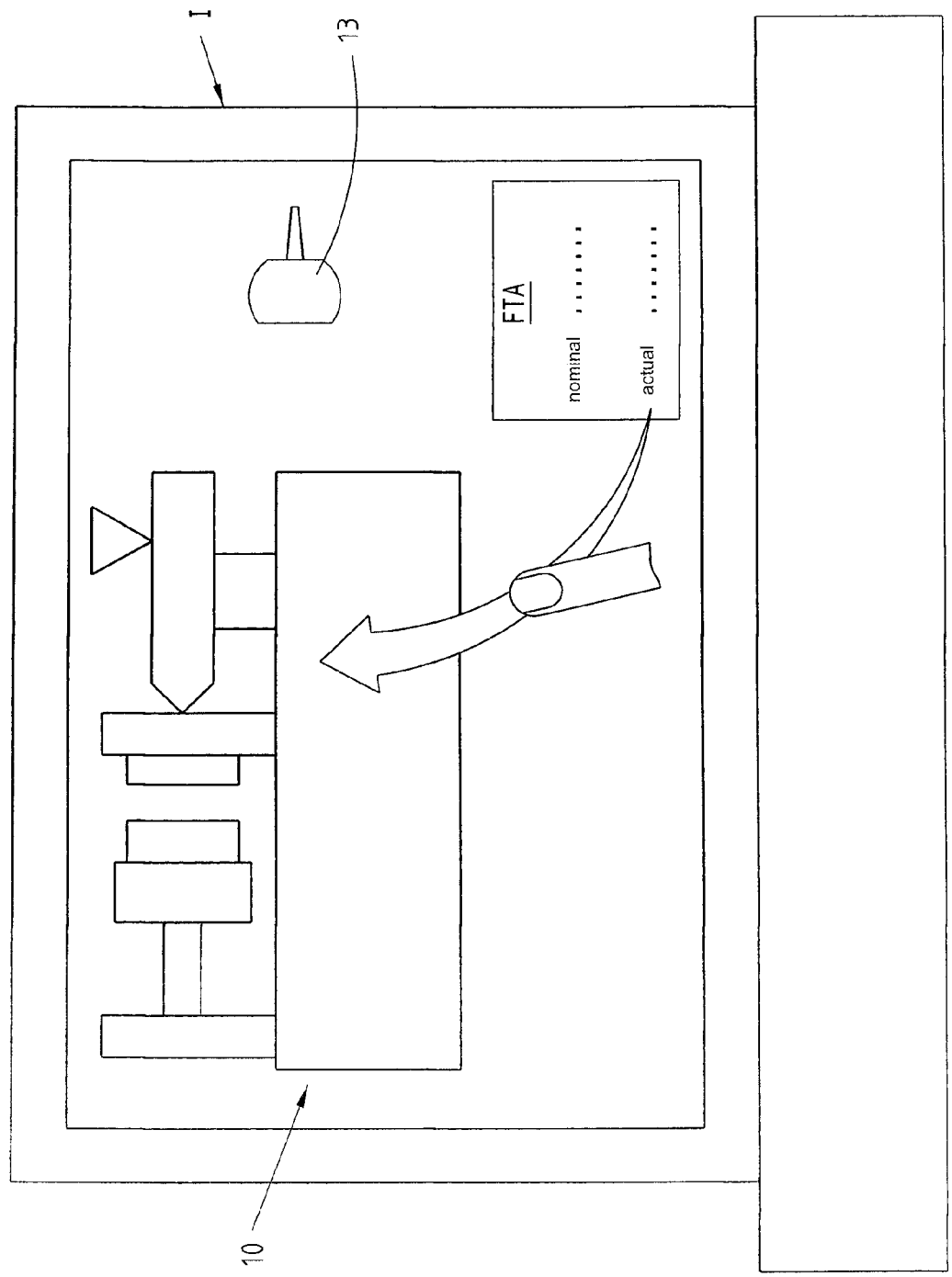
FIG. 3 is a schematic diagram of gesture-controlled operation.

In principle, the suggestions arising in the course of the processing according to the method may also be fed back plant-specifically to the operator. As is shown schematically in FIG. 3, the human-machine interface may for example create a connection to the picture of the machine or a pictorial connection to the machine components for the operator. Accordingly, once the plant and process parameters and the operating parameters have been prepared, the operator may be presented with further components which could appropriately be used on the machine for selection and subsequent optional further parameterization, by the molding assistant FTA for example offering specific nominal values. The selection may then be made, for example, by selecting or rejecting components by means of a gesture. The controller here checks in the background whether these actions are appropriate for manufacturing the injection molding 13. The pictorial representation combined with the intuitive gesture with a direct reference to components of the picture improves user-friendliness. As a result of the work of the post-processors or assistants, the operator is offered on a human-machine interface I the hardware selection options on the machine, which he/she can add by a gesture and then, if required, further parameterize.

It goes without saying that the present description may be subjected to the most varied modifications, changes and adaptations which are of the nature of equivalents to the appended claims.

The invention claimed is:

1. A method for operating a machine for processing plastics and other plasticisable materials, the machine having,
   a mold opening and closing unit for opening and closing an injection mold having at least one mold cavity for manufacturing an injection molding corresponding to a shape of the at least one mold cavity,
   an injection molding unit having means for plasticising and injecting the plasticisable material into the mold cavity,
   a controller of the machine which controller contains expert knowledge integrated in the software of the controller and embedded in the controller about operation of the injection molding machine, a geometry of the injection molding, and any present peripheral devices thereof and about manufacture of injection moldings using injection molding technology, in order to manufacture an injection molding with reference to injection molding parameters,
   comprising the steps:
   providing information about a component design for the injection molding to a molding assistant within the controller, wherein the geometry of the injection molding or of the at least one mold cavity are provided as the information of 3D data,
   calculating by means of the molding assistant at the machine plant and process parameters required for manufacturing the injection molding as injection molding parameters, using the geometry of the injection molding and expert knowledge about operation of the injection molding machine, wherein expert knowledge is adapted to enable the manufacturing of the injection molding by knowledge of the geometry and not by expert knowledge of the operator in relation to the machine, before an injection molding is produced for the first time and without prior offline simulation of the injection molding,
   testing of the plausibility of the plant and process parameters by means of the molding assistant, as to whether, using the information provided, an injection molding can be manufactured on the machine-,
   if plausibility testing reveals that the injection molding cannot be manufactured in this manner, establishing interactive contact with the operator to obtain further information which enables manufacture of the injection molding with modification of the plant and process parameters, and repeating the last two steps,
   if modification of the information is not possible, notifying the operator by means of the molding assistant that the injection molding is not manufacturable using this injection molding machine, if plausibility testing reveals that the injection molding is manufacturable, operating the injection molding machine using the plant and process parameters for manufacturing the injection molding.

2. A method according to claim 1, wherein, during manufacture of injection moldings, the controller acquires parameters about a manufactured injection molding as further information and thus iterates the method.

3. A method according to claim 1, wherein a material to be processed is specified to the controller or a material to be processed is selected by the operator from an existing selection of materials known to the controller, and wherein the material to be processed is used as information for calculating the plant and process parameters.

4. A method according to claim 1, wherein a mold gate geometry data on the injection molding are provided as information.

5. A method according to claim 1, wherein at least one of pressure, temperature, quantity of material, speed, position, time, core pulling activity, demolding or ejection of the injection molding, opening paths or speeds of individual components of the injection molding machine or of peripheral devices are provided setting parameters for the injection molding process as information or requested by the controller by interactive contact with the operator.

6. A method according to claim 1, wherein the controller is provided with information about the at least one mold cavity instead of information about the injection molding.

7. A method according to claim 1, wherein the controller has an injection mold assistant, wherein the method has the further steps:

providing geometry, structure and properties of the injection mold to the injection mold assistant, calculating operating parameters and the plant and process parameters for operation of the injection mold for manufacturing the injection molding on the injection molding machine taking account of the plant and process parameters calculated by the molding assistant, testing of the plausibility of the plant and process parameters by means of at least one of the molding assistant and the injection mold assistant, as to whether, using the information provided, an injection molding can be manufactured as an injection molding on the injection molding machine, if plausibility testing reveals that the injection molding cannot be manufactured in this manner, establishing interactive contact with the operator to obtain further information which enables manufacture as an injection molding with modification of at least one of the plant and process parameters and the operating parameters, and repeating the last two steps, if modification of the information is not possible, notifying the operator by the molding assistant that the injection molding is not manufacturable on the injection molding machine, if plausibility testing reveals that the injection molding is manufacturable, operating the injection molding machine using the plant and process parameters and the operating parameters for manufacturing the injection molding.

8. A method according to claim 7, wherein results of determination of operating parameters are provided visually to the operator via a human-machine interface for selection and further processing.

9. A method according to claim 8, wherein selection is made by operator gestures, while the controller tests the plausibility of an operator's selection.

10. A method according to claim 1, wherein the controller has a quality assistant, wherein required quality features of the component as an injection molding to be manufactured and associated tolerances are provided to the controller or requested by the controller by interactive contact with the operator, and wherein, on the basis of these specifications, the quality assistant determines plant parameterisation and quality feature models with corresponding monitoring tolerances which are to be calculated for plant measured variables and/or influences operating parameters for monitoring quality or optimising stability.

11. A method according to claim 1, wherein results of determination of the plant and process parameters are provided visually to the operator via a human-machine interface for selection and further processing.

12. A method according to claim 11, wherein the selection is made by operator gestures, while the controller tests the plausibility of an operator's selection.

* * * * *